United States Patent
Puetz et al.

(10) Patent No.: US 11,433,896 B2
(45) Date of Patent: Sep. 6, 2022

(54) VEHICLE LANE OPERATION

(71) Applicant: Ford Global Technologies, LLC, Dearborn, MI (US)

(72) Inventors: Andreas Puetz, Kelmis (BE); Guido Weitkus, Koeln/NRW (DE); Andreas Meyer, Kuerten/NRW (DE); Mohamed Benmimoun, Aachen/NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 483 days.

(21) Appl. No.: 16/448,249

(22) Filed: Jun. 21, 2019

(65) Prior Publication Data

US 2020/0001876 A1    Jan. 2, 2020

(51) Int. Cl.
*B60W 30/18* (2012.01)
*B60W 30/14* (2006.01)
*G08G 1/16* (2006.01)

(52) U.S. Cl.
CPC .... *B60W 30/18163* (2013.01); *B60W 30/143* (2013.01); *G08G 1/167* (2013.01)

(58) Field of Classification Search
CPC ..................................................... G08G 1/167
See application file for complete search history.

(56) References Cited

U.S. PATENT DOCUMENTS

| | | | |
|---|---|---|---|
| 2015/0321698 A1 | 11/2015 | Fuehrer et al. | |
| 2017/0101097 A1* | 4/2017 | Buchner | B60W 30/16 |
| 2018/0005523 A1* | 1/2018 | Cahan | G08G 1/096775 |
| 2019/0049994 A1* | 2/2019 | Pohl | G05D 1/0278 |
| 2019/0263410 A1* | 8/2019 | Groult | B60W 40/04 |

FOREIGN PATENT DOCUMENTS

| | | | |
|---|---|---|---|
| DE | 102011102024 A1 | 4/2012 | |
| DE | 102013220307 A1 | 4/2015 | |
| DE | 102014200700 A1 * | 7/2015 | G06K 9/00798 |
| DE | 102014200700 A1 | 7/2015 | |
| DE | 102015224106 A1 | 6/2017 | |
| EP | 2620929 A1 | 7/2013 | |
| WO | 2017148531 A1 | 9/2017 | |

OTHER PUBLICATIONS

Samiee et al., "Performance Evaluation of a Novel Collision Avoidance Lane Change Algorithm", Conference Paper, Jul. 2015, https://www.researchgate.net/publication/27714230.

* cited by examiner

*Primary Examiner* — Peter D Nolan
*Assistant Examiner* — Demetra R Smith-Stewart
(74) *Attorney, Agent, or Firm* — Frank A. MacKenzie; Bejin Bieneman PLC

(57) ABSTRACT

A computer includes a processor and a memory, the memory storing instructions executable by the processor to move a vehicle within a roadway lane according to an emergency lane procedure to form an emergency lane when a longitudinal speed of the vehicle is below a specified speed and end the emergency lane procedure when the longitudinal speed is at least a second specified speed.

12 Claims, 5 Drawing Sheets

VEHICLE LANE OPERATION

CROSS-REFERENCE TO RELATED APPLICATION

This patent application claims priority to German Application No. DE 102018210779.3 filed on Jun. 29, 2018, which is hereby incorporated by reference in its entirety.

BACKGROUND

In specific traffic situations, in particular on roads having multiple traffic lanes for each direction of travel, it is expedient—and in some states even legally required—to form an emergency lane. If there are two traffic lanes for each direction of travel, by way of example, such an emergency lane may extend in the middle of said two traffic lanes. If there are more than two traffic lanes for each direction of travel, it may be determined between which traffic lanes an emergency lane is to be formed, for example between the outermost left-hand lane and the traffic lane located to the right-hand side of said left-hand lane.

By way of example, § 11 paragraph 2 of the road traffic regulations of the Federal Republic of Germany regulates the formation of an emergency lane as follows: "As soon as vehicles on freeways and also on roads outside urban areas having two traffic lanes for one direction are traveling at walking speed or the vehicles come to a standstill, these vehicles must form a free lane for one direction between the outermost left-hand lane and the traffic lane located to the immediate right-hand side of said left-hand lane so that police and emergency vehicles may drive through."

Furthermore, in some states it is possible or customary that riders of two-wheeled vehicles that are not associated with the emergency services may use the emergency lane that is formed in order to overtake the other slow-moving or stationary vehicles. Even if in this event it is not mandatory to form a lane for the riders of two-wheeled vehicles, in spite of this said lane is frequently formed by the other road users.

Even in the event of a vehicle having automated lateral control, for example having a lane-keeping assistant, the vehicle should be controlled in such a manner that the necessary space for the emergency vehicles, riders of two-wheeled vehicles etc. is provided in that the position of said vehicle is changed according to the legal requirements and/or according to the customary behavior of the other road users.

In order to identify a traffic situation that requires the formation of an emergency lane, DE 10 2014 200 700 A1 and also EP 2 620 929 A1 propose to monitor vehicles in the surrounding area and to evaluate their behavior in order to be able to judge that there are sufficient indications for forming an emergency lane. However, this method requires the correct behavior of the vehicles in the surrounding area, which is however not always the case. US 2015/0321698 A1 proposes to output handling instructions for forming an emergency lane to the driver of a motor vehicle as soon as a corresponding request is received from another vehicle, for example a police vehicle. The handling instructions are coordinated with other vehicles in the surrounding area.

The method in DE 10 2011 102 024 A1 relates to receiving a request to form an emergency lane in the form of emergency information regarding an emergency situation that lies ahead in the direction of travel. When information regarding such an emergency situation is received, an at least in part automatic engagement into the steering system, braking system and/or the drive train of the vehicle is performed in order to form an emergency lane. Although the two latter-mentioned methods may be more reliable with regard to the necessity of forming an emergency lane than the methods that are based upon the behavior of the vehicles in the surrounding area, problems may occur with regard to the reliability since on the one hand a suitable receiving unit for receiving the request to form an emergency lane must be provided and on the other hand it is not possible to ensure the request is transmitted without any problems in every situation, for example in the region of dead zones.

DE 10 2013 220 307 A1 describes a method in which one or multiple first parameters that characterize the traffic situation which the motor vehicle is in and one or multiple second parameters that characterize the area surrounding the vehicle are ascertained and whether or not it is necessary to form an emergency lane is determined with reference to the ascertained first parameters and one or more actions of the motor vehicle are determined for forming an emergency lane with reference to the ascertained second parameters.

The traffic situation may be identified in relation for example to traffic information that is transmitted by a road operator or transportation provider and received by the system.

Alternatively or in addition, the traffic situation may be identified with the aid of a sensor system that is provided on the vehicle, said sensor system ascertaining the area surrounding the vehicle and monitoring the area surrounding the vehicle, for example radar systems, lidar systems, ultrasonic systems and/or camera systems. However, even in this case the complex sensor system and/or the receiving system may comprise malfunctions or the transmission of the traffic information may be impaired. Moreover, the sensor system and/or the receiving system result(s) in additional costs.

SUMMARY

The fundamental idea of the disclosure is to assess with reference to the longitudinal speed of the vehicle whether it is necessary to form an emergency lane and where applicable to trigger and to perform the procedure for forming an emergency lane.

A method for forming an emergency lane of a vehicle includes, for this purpose, a step of determining a minimum speed at which it is necessary to form an emergency lane, a step of determining the longitudinal speed of the vehicle, a step of comparing the longitudinal speed that is determined with the minimum speed, a step of activating the procedure for forming an emergency lane if the longitudinal speed falls below the minimum speed and a step of deactivating the procedure for forming an emergency lane if the longitudinal speed achieves or exceeds the minimum speed.

The method may be implemented in a computer-aided manner, in other words using a data processing device or together with a computer. In particular, the procedure for comparing the longitudinal speed that is determined with the minimum speed may be aided by a computer, wherein the procedure for forming an emergency lane may be automatically activated in dependence upon the result of this comparison.

As is evident from the introductory description, the term "emergency lane" is understood to mean a route for emergency personnel that is to be formed by road users in the event of a traffic jam or in the event of traffic flowing at walking speed on multi-lane carriageways.

Accordingly, the minimum speed at which it is necessary to form an emergency lane is in the range of 5 km/h to 25 km/h or in the range of 5 km/h to 20 km/h or in the range of 5 km/h to 15 km/h and may be determined accordingly.

The procedure for determining the longitudinal speed, in other words the speed in the direction of travel of the vehicle, may be performed by means of measuring devices and/or sensor devices that are usually provided in the vehicle. Devices of this type for determining the vehicle speed and also for monitoring the procedure for keeping to speed limits are provided in the vehicle with the result that the implementation of the method may use measuring devices and/or sensor devices that are already provided in the vehicle. Consequently, there are no additional costs for these devices.

Whether to form an emergency lane or not is determined by comparing the longitudinal speed that is determined with the previously determined minimum speed. In other words, if the longitudinal speed falls below the minimum speed, the procedure for forming an emergency lane is consequently activated. If the longitudinal speed does not fall below the minimum speed, in other words if the minimum speed is achieved or exceeded, the procedure for forming an emergency lane by means of the vehicle remains deactivated or is deactivated.

The procedure for forming an emergency lane by means of the vehicle may subsequently be performed by the driver of the vehicle or preferably may be performed in a semi-autonomous or fully autonomous manner in that corresponding information is output to the driver and/or engagements into the control of the vehicle are performed. The method can be suitable accordingly in particular for semi-autonomous or fully autonomous vehicles, wherein the term "autonomous vehicle" is to be understood as a self-driving vehicle that may perform all safety critical functions for the entire driving procedure itself with the result that it is not necessary for the driver to assume control at any time. The autonomous vehicle controls all functions itself from the start until the stop including all parking functions. In addition, a manual mode may also be provided in which a human driver controls all or a part of the vehicle functions. If the driver controls a part of the vehicle functions himself, the vehicle is a semi-autonomous vehicle.

The method renders it possible in a simple and cost effective manner to identify whether it is necessary to form an emergency lane, said method moreover comprising a low susceptibility to failure. On account of the use of the measuring devices and/or sensor devices for determining the longitudinal speed, there is an increased reliability when the relevant situations are identified since these devices are more readily available in comparison to infrastructure sensors and environmental sensors. Moreover, as a result of this there is a cost advantage since the implementation of infrastructure sensors and environmental sensors is associated with additional costs while measuring devices and/or sensor devices for determining the longitudinal speed are available as standard in the vehicle.

Furthermore, the link between it being necessary to form an emergency lane and the longitudinal speed is in direct compliance with legal requirements, for example in Germany. As a result of this, it is possible to better conform to the legal requirements, which may not be possible when using infrastructure sensors and environmental sensors to identify the situation. A further advantage is achieved in that in slow traffic, in other words if the longitudinal speed falls below the minimum speed, the emergency lane that is formed may be used where applicable by other vehicles, for example two-wheeled vehicles, for overtaking purposes. This is a customary and/or reliable behavior in various states, as a result of which the adoption of the method may be increasingly accepted by the road users.

In accordance with various embodiment variants, the method may comprise a step of determining a maximum speed at which it is necessary to form an emergency lane and may comprise a step of comparing the longitudinal speed that is determined with the maximum speed, if the procedure for forming an emergency lane is activated. This comparison may preferably be performed in a computer-aided manner. The procedure for forming the emergency lane is only then deactivated if the maximum speed is also achieved or exceeded.

An undesired frequent switching between an activation and a deactivation of the procedure for forming an emergency lane may thus be avoided for example in the event of the longitudinal speed being in the range of the minimum speed and said longitudinal speed falling below and exceeding said minimum speed in short intervals. The deactivation of the procedure for forming an emergency lane is delayed by means of the introduction of the maximum speed, namely only in the event of the maximum speed being achieved or exceeded. The maximum speed may be by way of example 5 km/h to 15 km/h higher than the minimum speed. By way of example, the maximum speed may be in the range of 10 km/h to 40 km/h.

In accordance with further embodiment variants, the method may comprise a step of determining a distance from a center line of a traffic lane that is being driven by the vehicle, wherein when the procedure for forming an emergency lane is activated, the vehicle is arranged offset by the distance from the center line.

In other words, the emergency lane may be formed in that the vehicle is arranged laterally offset on the traffic lane. In this case, it may be possible to cross the delimitation of the roadway. The offset arrangement may either be to the right-hand side or left-hand side of the center line, for example in dependence upon legal requirements with regard to the manner of the procedure for forming an emergency lane, the number of traffic lanes and/or in dependence upon whether the traffic is driving on the right-hand side or the left-hand side of the road. Such a distance is implemented or may be implemented in an automated lateral control device of the vehicle and may be incorporated into the procedure for determining the route that is to be traveled. It is preferred that the vehicle is automatically arranged offset from the center line by the distance.

The distance may be determined in dependence upon the longitudinal speed, a width of the traffic lane, a marking of the traffic lane, a width of the vehicle and/or a minimum distance of the vehicle from the marking of the traffic lane. Further parameters may likewise be taken into account.

Consequently, it is possible on the one hand for a sufficiently wide emergency lane to be formed and on the other hand for the vehicle to not be at risk, for example in that said vehicle is too far away from the center line.

In accordance with further embodiment variants, the method may comprise a step of ascertaining environmental parameters of the vehicle. The procedure for forming an emergency lane is only then activated if the environmental parameters confirm that it is necessary to form an emergency lane.

The environmental parameters may be provided by way of example by means of various sensors that are provided on the vehicle and/or in the area surrounding the vehicle, for example radar sensors, lidar sensors, ultrasonic sensors and/or camera sensors.

In other words, an emergency lane is then only formed if the environmental parameters have verified that said emergency lane is necessary. Consequently, it is possible to prevent an undesired emergency lane from being formed. This may be required by way of example in a situation in which on account of external circumstances the emergency lane should be formed differently than otherwise provided, for example if there are roadworks or the emergency vehicle selects another route than the one provided.

The environmental parameters that are ascertained may also be taken into account alternatively or in addition when an emergency lane is formed. By way of example, a check may be performed as to whether it is necessary to drive over the delimitation of the traffic lane in order to form a sufficiently wide emergency lane and whether the unevenness of the road, for example the road surface, allows the vehicle to perform such a maneuver. As a consequence, an improved flexibility with regard to the procedure for forming an emergency lane may be achieved.

A system for forming an emergency lane by means of a vehicle includes a device for determining the longitudinal speed of the vehicle and a control unit that is configured and embodied so as to compare the longitudinal speed that is determined with a minimum speed, to output a control signal for activating the procedure for forming an emergency lane if the longitudinal speed falls below the minimum speed and to output a control signal for deactivating the procedure for forming an emergency lane if the minimum speed is achieved or exceeded. The system may be used by way of example so as to implement the above-explained method. The above statements with regard to explaining the method are therefore also used to describe the system. The advantages of the system correspond to those of the method and to those of the corresponding embodiment variants of said method.

The control unit may receive input data from the device for determining the longitudinal speed, may process the input data and may output control signals to actuators as a reaction to the processed input data based upon instructions or a code that is programmed in the control unit corresponding to one or multiple routines in order to activate the procedure for forming an emergency lane.

The control unit may be realized in accordance with hardware and/or in accordance with software and may be embodied physically as a single part or multiple parts. The control unit may be a part of a controller of a lane-keeping assistant (lane centering) or may be integrated into said lane-keeping assistant. By way of example, a program code for identifying a situation for forming an emergency lane and also the implementation of the actions that are derived therefrom may be implemented in a control device that includes the lane-keeping assistant. Optionally, the control unit may also be configured and embodied for the purpose of comparing the longitudinal speed that is determined with a maximum speed and outputting a control signal for deactivating the procedure for forming an emergency lane if the maximum speed is achieved or exceeded.

In accordance with various embodiment variants, the system may comprise sensors for ascertaining environmental parameters of the vehicle, wherein the control unit is configured and embodied for the purpose of receiving and processing sensor signals of the sensors and wherein the control signal for activating the procedure for forming an emergency lane is only then output if the environmental parameters that are ascertained confirm that it is necessary to form an emergency lane.

A vehicle, for example a passenger car or truck comprises a system in accordance with the above description. The vehicle may be embodied as a semi-autonomous or fully autonomous vehicle. The advantages of the vehicle correspond to those of the system and its corresponding embodiment variants.

A computer program product includes commands that result in the above-described system or vehicle implementing a method. The computer program product is stored on a computer-readable data carrier.

The following description and the figures clarify further advantages of the present disclosure.

DETAILED DESCRIPTION

Figure 1:
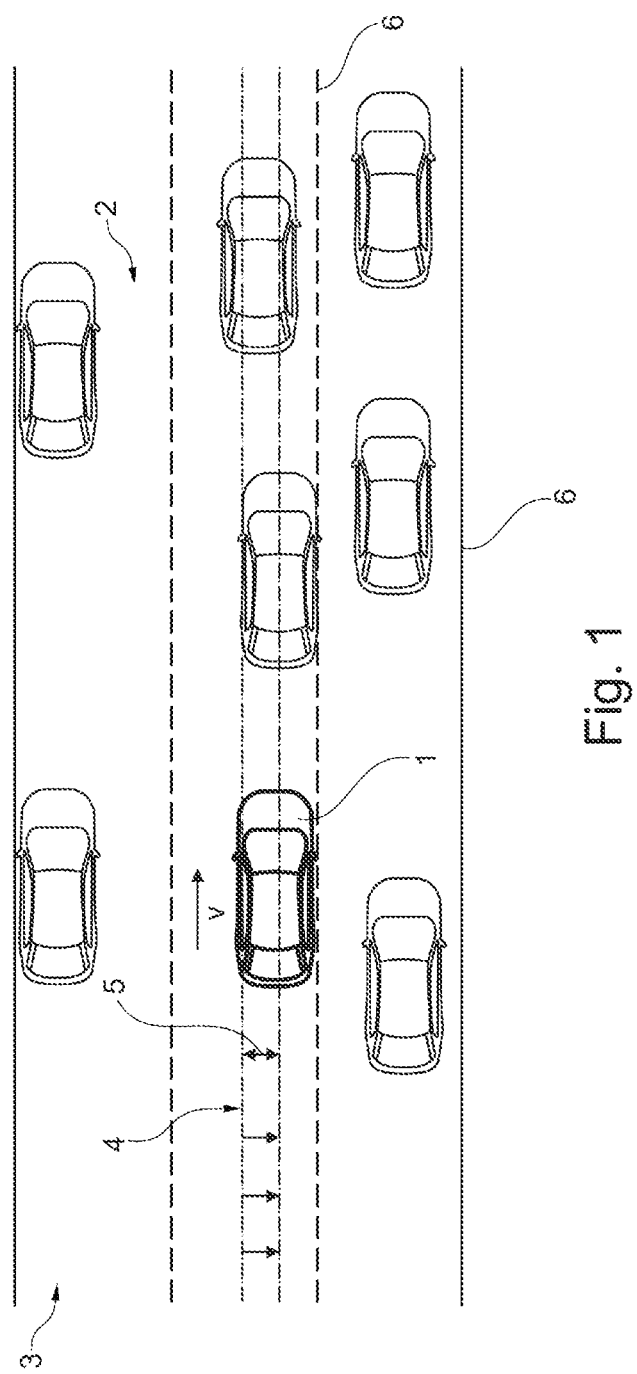
FIG. 1 illustrates a schematic sketch of the procedure for forming an emergency lane.

FIG. 1 illustrates a schematic sketch for the procedure for forming an emergency lane on a road having three traffic lanes 3 that extend in one direction of travel. The traffic lanes are separated from one another by means of a dashed marking 6 and from the edge of the road by means of solid markings 6. Each traffic lane comprises a hypothetical center line 4 (illustrated in FIG. 1 for the middle traffic lane). The vehicles may travel centrally on the traffic lane 3 as is illustrated in FIG. 1 for the vehicles of the right-hand side traffic lane 3.

It is determined that the emergency lane 2 is to be formed between the left-hand side and the middle traffic lane 3 when viewed in the direction of travel. The vehicle 1 that is moving at a longitudinal speed v of by way of example v=10 km/h in the direction of travel is arranged offset by the distance 5 from the center line 4 so as to form the emergency lane 2.

Figure 2:
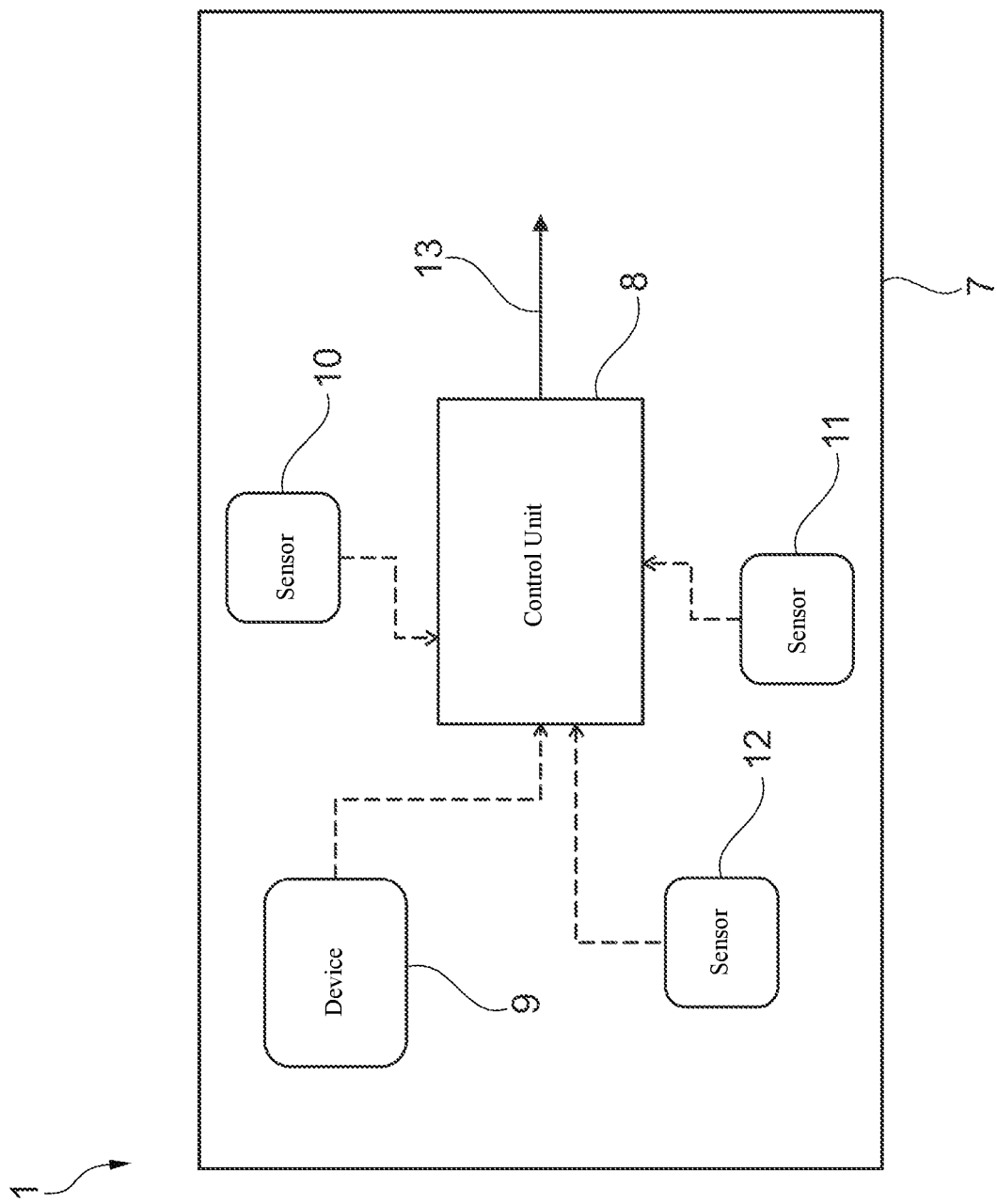
FIG. 2 illustrates schematically an exemplary vehicle.

The vehicle 1 is equipped as is illustrated in FIG. 2 with a system 7 for forming an emergency lane. This system comprises a device 9 for determining the longitudinal speed v. This device 9 is connected to a control unit 8 so as to transmit signals. The control unit 8 receives a measurement signal from the device 9 and compares the longitudinal speed v that is determined with a previously determined minimum speed of for example 12 km/h.

Moreover, the system 7 comprises sensors 10, 11, 12 for ascertaining environmental parameters of the vehicle 1. In this case, in the exemplary embodiment said sensors are a camera sensor 10, an ultrasonic sensor 11 and a radar sensor 12. The sensors 10, 11, 12 are likewise connected to the control unit 8 so as to transmit signals.

The control unit 8 receives sensor signals from the sensors 10, 11, 12 and likewise processes these signals. Depending upon the result from processing the measuring signal from the device 9 and the sensors 10, 11, 12, the control unit 8 may output a control signal 13 that leads to activating or deactivating the procedure for forming an emergency lane.

Figure 3:
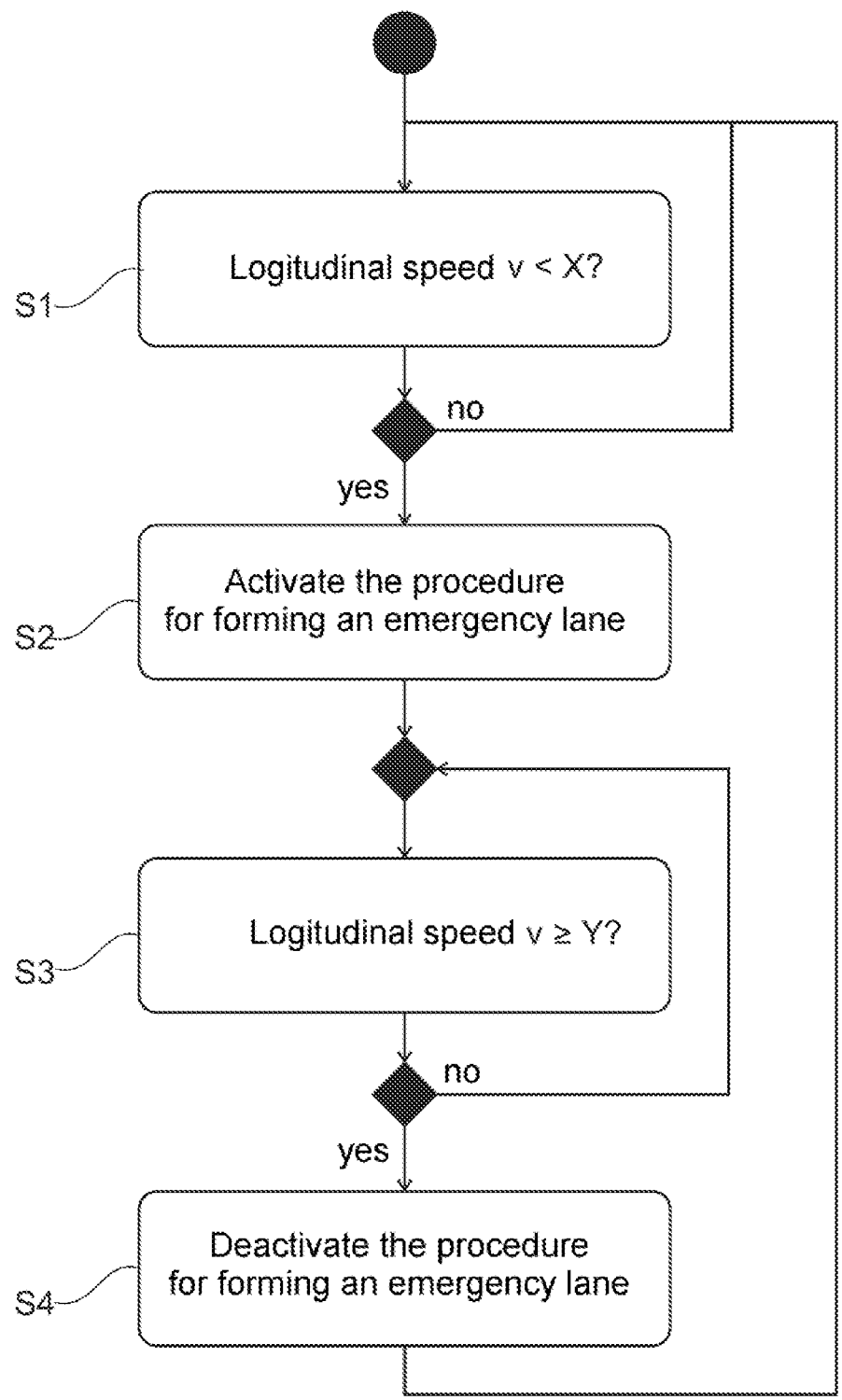
FIG. 3 illustrates a flowchart of an exemplary method.

The vehicle 1 in accordance with FIG. 2 may implement the method for forming an emergency lane, which is described below with reference to the FIGS. 3 and 4.

In a step S1, the minimum speed X is determined, for example X=12 km/h. Moreover, the longitudinal speed v of the vehicle 1 is determined by means of the device 9. This longitudinal speed is for example 10 km/h. A check is now performed as to whether the longitudinal speed v falls below the minimum speed X, in other words whether v<X applies. If this is the case, the method continues to step S2. If this is not the case, the longitudinal speed v of the vehicle 1 is determined again.

In step S2, the procedure for forming an emergency lane is activated as a consequence of the longitudinal speed falling below the minimum speed X. For this purpose, the vehicle 1 may be arranged offset by a previously determined distance 5 from the center line 4 of a traffic lane that is being driven on by the vehicle 1. By way of example, the situation that is illustrated in FIG. 1 may occur. The method subsequently continues to step S3.

In step S3, the longitudinal speed v of the vehicle 1 is determined again, however it is now compared with a previously determined maximum speed Y. A check is therefore performed as to whether the longitudinal speed v has achieved or exceeded the maximum speed Y, in other words whether v Y applies. If this is the case, the method continues to step S4. If this is not the case, an emergency lane continues to be formed and the longitudinal speed v of the vehicle 1 is determined again.

In step S4, the procedure for forming an emergency lane is deactivated as a consequence of achieving or exceeding the maximum speed Y. The method may now be implemented again starting at step S1.

Figure 4:
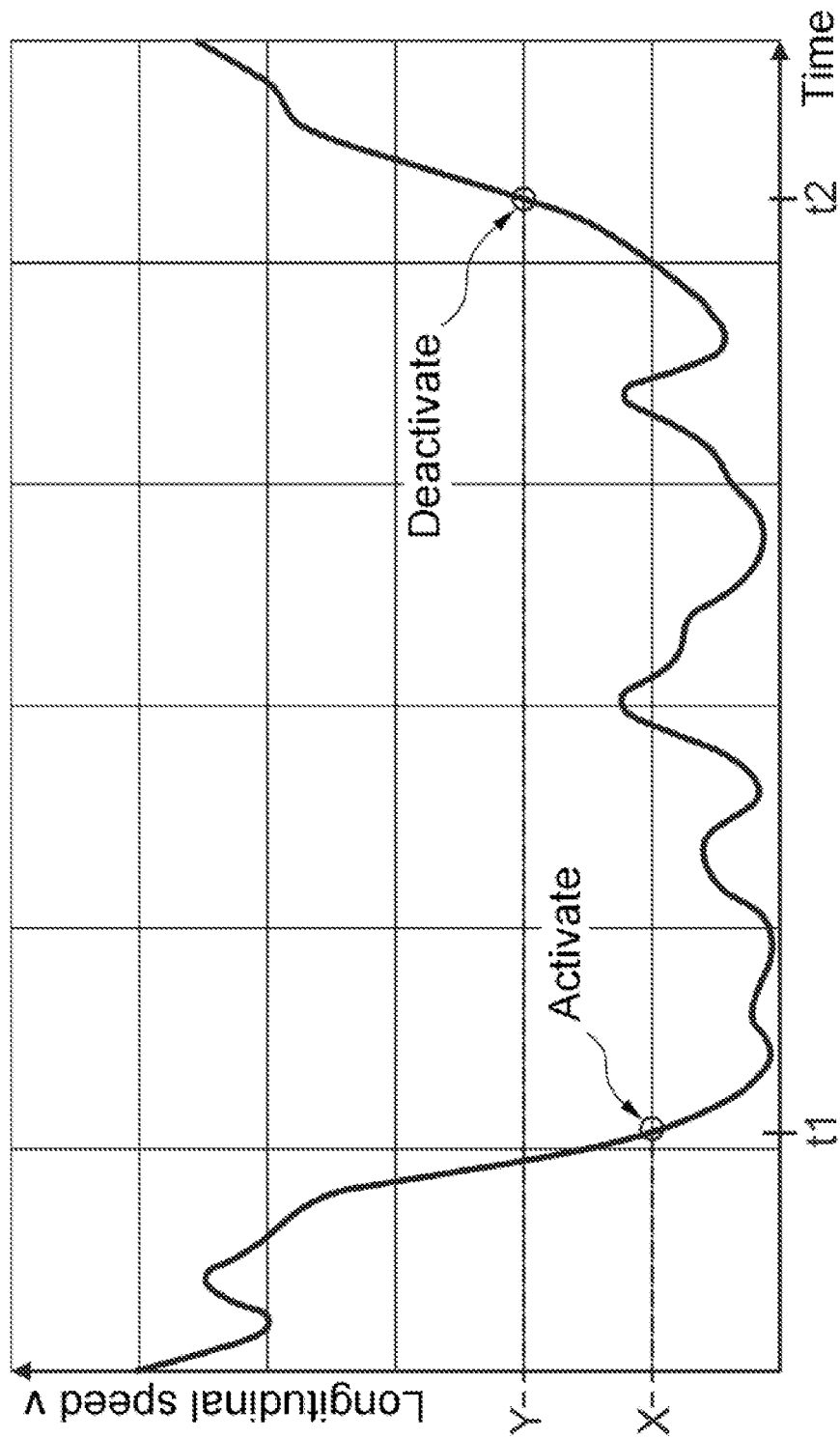
FIG. 4 illustrates schematically the procedure for activating and deactivating the procedure for forming the emergency lane.

FIG. 4 illustrates an exemplary temporal curve of the longitudinal speed v of the vehicle 1. Initially, the vehicle 1 has a high longitudinal speed v. For example, the vehicle 1 must brake on account of a traffic jam forming. At the activating point in time t1, the longitudinal speed falls below the minimum speed and the procedure for forming an emergency lane is triggered. Subsequently, the longitudinal speed v of the vehicle 1 initially remains low, however it may occasionally exceed the minimum speed X. However, the procedure for forming an emergency lane is only then deactivated at the deactivating point in time t2 at which the maximum speed Y is also exceeded.

Figure 5:
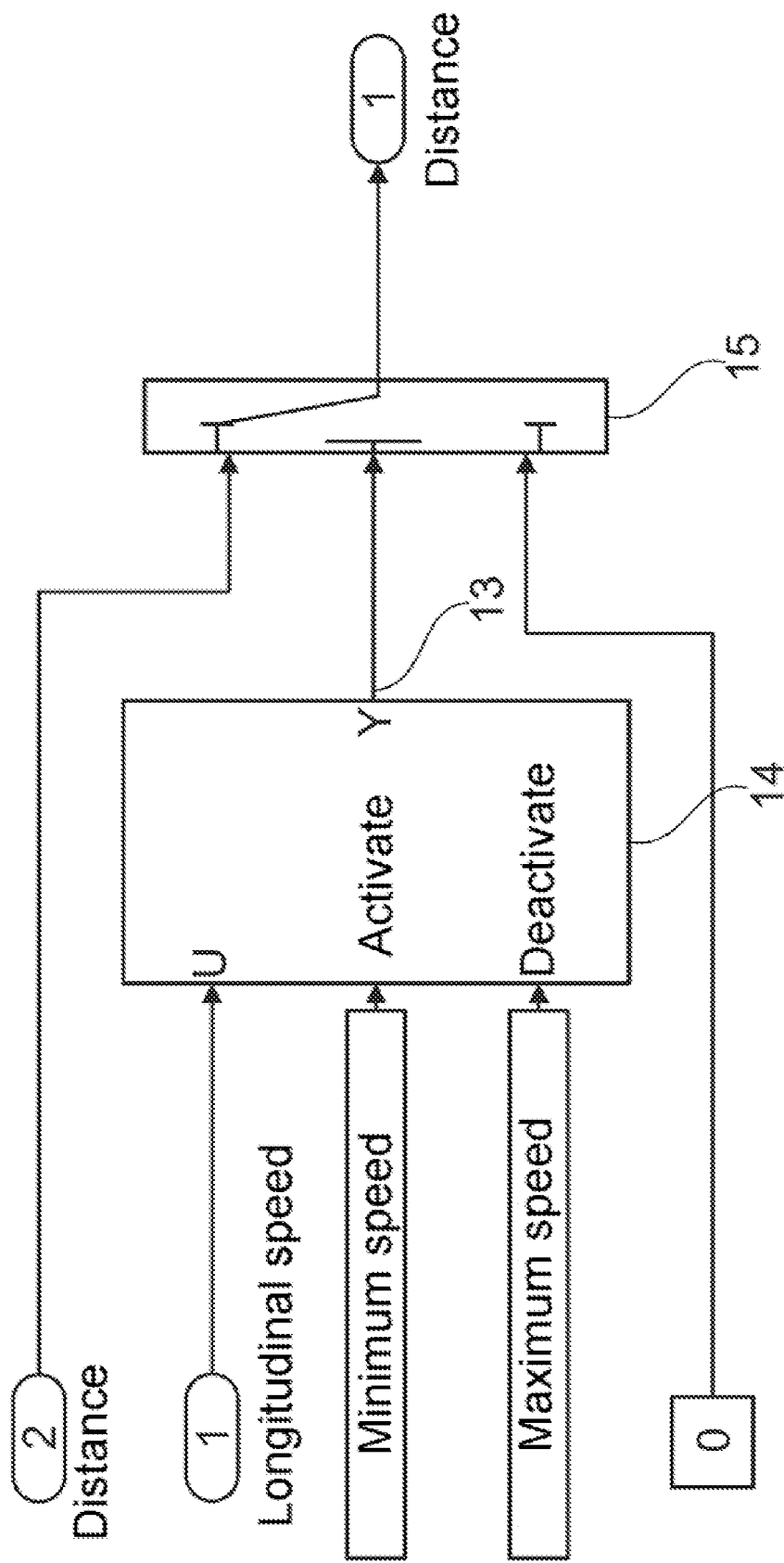
FIG. 5 illustrates an exemplary implementation of the procedure in a simulation program.

FIG. 5 illustrates an exemplary implementation in a simulation program. Initially, the longitudinal speed v and the distance 5 are determined as input variables. The distance 5 may be predetermined in this case as a fixed value or may be determined in dependence upon further parameters, such as for example the longitudinal speed v, a width of the traffic lane 3, a marking 6 of the traffic lane 3, a width of the vehicle 1 and/or a minimum distance of the vehicle 1 from the marking 6 of the traffic lane 3.

The input variables are processed in the hysteresis block 14 that is implemented in the control unit 8 in that said input variables are compared with the minimum speed X and the maximum speed Y. A check is therefore performed as to whether the longitudinal speed v falls below the minimum speed X or not and whether the longitudinal speed v has achieved or exceeded the maximum speed Y. Depending upon the result of this comparison, a control signal 13 is output to the switch 15.

The switch 15 then accordingly determines whether the procedure for forming an emergency lane is activated, in other words the vehicle 1 is then arranged offset by the distance 5, as illustrated in FIG. 5, or not.

Although the disclosure is further illustrated and described in detail by means of the preferred exemplary embodiments, the disclosure is not thus limited by means of the disclosed examples and other variations may be derived therefrom by the person skilled in the art without departing the protective scope of the disclosure.

The figures are not necessarily accurate in every detail nor to scale and may be illustrated as enlarged or reduced in size in order to offer an improved overview. Functional details that are disclosed here are therefore not to be understood as limiting but rather only as a visual basis that offers the person skilled in the art in this field of technology instruction in order to use the present disclosure in a diverse manner.

The expression "and/or" that is used here if it is used in a series of two or multiple elements means that each of the stated elements may be used alone or any combination of two or more of the stated elements may be used. If by way of example a composition is described that includes the components A, B and/or C, the composition may include A alone; B alone; C alone; A and B in combination; A and C in combination; B and C in combination; or A, B and C in combination.

LIST OF REFERENCE NUMERALS

1 Vehicle
2 Emergency lane
3 Traffic lane
4 Center line
5 Distance
6 Marking
7 System
8 Control unit
9 Device for determining the longitudinal speed
10 Camera sensor
11 Ultrasonic sensor
12 Radar sensor
13 Control signal
14 Hysteresis block
15 Switch
v Longitudinal speed
X Minimum speed
Y Maximum speed
t1 Activating point in time
t2 Deactivating point in time

The invention claimed is:

1. A method, comprising:
moving a vehicle within a roadway lane according to an emergency lane procedure to form an emergency lane when a longitudinal speed of the vehicle is below a specified speed;
determining an offset distance from a center line of the roadway lane and moving the vehicle away from the center line of the roadway lane by at least the offset distance; and
ending the emergency lane procedure when the longitudinal speed is at least a second specified speed.

2. The method of claim 1, wherein the specified speed and the second specified speed are the same.

3. The method of claim 1, wherein the offset distance is determined based on at least one of the longitudinal speed of the vehicle, a width of the roadway lane, a marking of the roadway lane, a width of the vehicle, or a minimum distance of the vehicle from the marking of the traffic lane.

4. The method of claim 1, further comprising moving across a marking of the roadway lane to form the emergency lane.

5. A system comprising a computer including a processor and a memory, the memory storing instructions executable by the processor to:

move a vehicle within a roadway lane according to an emergency lane procedure to form an emergency lane when a longitudinal speed of the vehicle is below a specified speed;

determine an offset distance from a center line of the roadway lane and move the vehicle away from the center line of the roadway lane by at least the offset distance; and end the emergency lane procedure when the longitudinal speed is at least a second specified speed.

6. The system of claim 5, wherein the specified speed and the second specified speed are the same.

7. The system of claim 5, wherein the instructions further include instructions to moving across a marking of the roadway lane to form the emergency lane.

8. The system of claim 5, wherein the offset distance is determined based on at least one of the longitudinal speed of the vehicle, a width of the roadway lane, a marking of the roadway lane, a width of the vehicle, or a minimum distance of the vehicle from the marking of the traffic lane.

9. A system, comprising:
a vehicle speed sensor;
means for moving a vehicle within a roadway lane according to an emergency lane procedure to form an emergency lane when a longitudinal speed of the vehicle detected by the vehicle speed sensor is below a specified speed;

means for determining an offset distance from a center line of the roadway lane and means for moving the vehicle away from the center line of the roadway lane by at least the offset distance; and means for ending the emergency lane procedure when the longitudinal speed detected by the vehicle speed sensor is at least a second specified speed.

10. The system of claim 9, wherein the specified speed and the second specified speed are the same.

11. The system of claim 9, wherein the offset distance is determined based on at least one of the longitudinal speed of the vehicle, a width of the roadway lane, a marking of the roadway lane, a width of the vehicle, or a minimum distance of the vehicle from the marking of the traffic lane.

12. The system of claim 9, further comprising means for moving across a marking of the roadway lane to form the emergency lane.

* * * * *

UNITED STATES PATENT AND TRADEMARK OFFICE
CERTIFICATE OF CORRECTION

| | |
|---|---|
| PATENT NO. | : 11,433,896 B2 |
| APPLICATION NO. | : 16/448249 |
| DATED | : September 6, 2022 |
| INVENTOR(S) | : Andreas Puetz |

It is certified that error appears in the above-identified patent and that said Letters Patent is hereby corrected as shown below:

On the Title Page

Column 1, before Item (51), please insert the following:
--Foreign Application Priority Data
June 29, 2018 (DE) .................102018210779.3--.

Signed and Sealed this
Eighth Day of November, 2022

Katherine Kelly Vidal
*Director of the United States Patent and Trademark Office*